United States Patent Office 2,858,221
Patented Oct. 28, 1958

2,858,221
METHOD OF PROCESSING CITRUS MEATS

Douglas C. Laurie, Dade City, Fla., assignor to Laurie-Massey, Inc., Dade City, Fla., a corporation of Florida No Drawing. Application April 25, 1955
Serial No. 503,781

8 Claims. (Cl. 99—105)

The present invention relates to food products, and more particularly relates to a method for converting waste citrus meats after they have been emptied of their juice into edible food products and food additives.

For a better understanding it may be mentioned that a citrus fruit for example an orange contains, in addition to peel and seeds, larger membranes covering the segments which membranes, when removed and separated are usually called "rags," and it further contains also tiny little sacs, cells or pockets which contain the juice and which are hereinafter termed "meats" and which after the juice has been emptied are hereinafter termed "emptied meats" or "meat pulp."

At present in the production of frozen citrus juices, the citrus fruit is fed to an extractor wherein the juice and meat of the fruit are separated from the peel and seeds. The meat and juice then go to a "finisher" wherein the juice is expressed from the meat of the fruit.

The citrus meat when emptied of its juice consists essentially of the juice sacs. Ordinarily, the emptied meat or meat pulp comprises 70–99% moisture after emptying of the juice therefrom and constitutes a useless waste product. It is common practice in the citrus industry to dump the meat pulp in with the peel and seeds in the preparation of livestock feed known as "citrus meal" or "citrus pulp," as a filler for the meal.

Per se, the emptied meats are generally considered useless since it would take ten to twelve times as much cellular material from the meats to make the same amount of feed as from the peel and seed pulp. Further, the emptied meats when exposed to sunlight for any considerable time turns rancid and constitute a sanitation problem. Sanitation laws prevent the indiscriminate dumping of the emptied meats and to make it generally difficult to dispose of these meats; thus, the addition of the meats to the peel and seeds for the formation of livestock feed, even though the presence of this meat detracts from the value thereof, has evolved as the most practical manner of disposing of the emptied meats.

The present invention is based on the discovery of a method for converting the heretofore useless emptied citrus meats into edible food products.

Research has shown that the emptied meats contain some vitamins, provitamins and protopectins which are of value.

I have discovered that if after the recovery of the juice from the citrus meats in the juice finisher, the emptied meats are processed in accordance with the present invention prior to the development of rancidity thereof a wide variety of edible food products may be obtained from these meats.

In the practice of the invention after the removal of the juice from the meats, the emptied meats are immediately blended with an aqueous liquid along with a suitable concentrated flavoring material to form a liquid mass. The consistency of the mass will of course vary and the liquid mass may then be bagged, packaged or otherwise prepared for shipment and frozen. Or, the liquid may be poured into suitable molds in the formation of molded frozen products.

The emptied meats of the citrus fruit after the juice has been expressed therefrom are relatively tasteless and contain none of the bitter taste of the peel and seeds of the citrus fruits. Consequently I have discovered that by adding a concentrated flavoring to the emptied meats an edible food product is formed which may be utilized as a flavoring and binder in the formation of gelatins, ice creams, sherbets, frozen ices etc.

By adding a sweetener or sweetening agent to the flavoring and liquid in blending the liquid with the emptied meats, and then pouring the mixture into molds and freezing the same around sticks it is possible to form a frozen ice on a stick which will not readily melt or drip and which possesses a very tasteful flavor while at the same time forming a nutritious food product, especially as the emptied meats of citrus fruits will contain some vitamins and other valuable components.

In the formation of frozen flavored ice on a stick, possessing for example an orange flavor, a quantity of orange meat from which the juice has been expressed is treated with an orange oil concentrate and a quantity of orange juice is added thereto along with suitable sweetening agents such as corn and cane sugar syrups. The mass is agitated into a liquid consistency and then suitably packaged and frozen for shipment.

To form a frozen orange flavored edible, the packaged mixture is thawed again to a liquid state and the liquid poured into suitable mold cavities and frozen on a stick and eaten much in the manner of flavored ice frozen on a stick.

Other flavored frozen products may be made in the same manner by treating the citrus meat pulp with suitable flavoring agents and suitably flavored and colored aqueous liquids. Thus, the meat pulp of an orange may be utilized to produce raspberry, cherry, or other flavored frozen citrus meats.

The amount of liquid, sweetener if any, flavoring and other ingredients to be blended with the citrus meat pulp may be varied with the product desired as may the addition of coloring material.

In the formation of a frozen orange meat on a stick, the following composition has been found to give excellent results.

| | | |
|---|---|---|
| Orange meat pulp | lbs | 1½ |
| Corn syrup | oz | 2 |
| Cane syrup | oz | 4 |
| Fresh orange juice | oz | 6 |
| Single strength orange oil | drops | 20 |

Single strength orange oil as set forth above is simply that oil which is obtained from the first pressing of the rind or peel of an orange.

The other ingredients are simply added to the meat pulp and the mixture blended by agitation into a viscous, liquid mass. The mass upon being poured into mold cavities around supporting sticks forms a delectable frozen ice on a stick with high nutritional value by virtue of the nutritious pulp forming the binder thereof. Further, the ice will not readily drip when melting, being held in a cohesive manner by the citrus meat pulp forming the carrier therefor.

Of course, it is to be understood that the foregoing example merely sets forth one edible product made from the citrus meat pulp heretofore considered waste. Obviously, the meat pulp may be prepared as ice cream or sherbet flavorings, gelatin additives or flavorings, as an ingredient in the preparation of frozen salads and in other manners, the invention herein lying in the discovery of a simple and effective manner of converting citrus meat pulp into usable food products for human consumption.

What is claimed as new is as follows:

1. A process of producing an edible citrus fruit product which consists in separating the meat pulp of the citrus fruit from the peel, seeds and membranes covering the segments, in emptying the juice from said meat pulp and in mixing the emptied meat pulp with an aqueous liquid containing citrus fruit juice together with a concentrated flavoring material, the liquid being added to the emptied meat pulp in an amount sufficient to produce a viscous, substantially liquid mixture.

2. A process of producing an edible citrus fruit product which consists in separating the peels and seeds and the membranes of the citrus fruit segments from the meat and in emptying the juice from the meat, in adding to and mixing with the emptied meat pulp having a high moisture content an aqueous liquid comprising juice emptied from the meat, a sweetening agent and an oil produced by pressing the peel of the citrus fruit, the liquid being added to the emptied meat in an amount sufficient to produce a viscous, substantially liquid pourable mixture.

3. A process of producing a frozen edible citrus fruit product which consists in separating the peels and seeds and the membranes of the citrus fruit segments from the meat and in emptying the juice from the meat, in adding to and mixing with the emptied meat pulp having a high moisture content an aqueous liquid containing juice emptied from the meat, a sweetening agent and an oil produced by pressing the peel of the citrus fruit, the liquid being added to the emptied meat in an amount sufficient to produce a viscous substantially liquid pourable mixture, and in freezing the mixture.

4. A process of producing an edible citrus ice as claimed in claim 3, wherein the frozen mixture is thawed, the liquid is poured into mold containers and wherein a stick is inserted into the mold cavity and the liquid is again frozen on the stick.

5. The process of producing an edible frozen citrus fruit product wherein the peels, seeds and segmental membranes of an orange are removed from the meat sacs of the orange and wherein the juice is completely emptied from the said meat sacs, the latter forming a meat pulp of high moisture content, the emptied meat sacs being blended with orange juice and a liquid sweetening agent and with some of the oil obtained by pressing the orange peel, the amount of liquid added being just large enough to convert the mixture into a viscous but substantially pourable liquid mixture and in freezing said mixture.

6. The process of producing an edible citrus fruit product as claimed in claim 5, wherein for 1½ pounds of orange meat pulp having a moisture content of 70%–99% about 6 oz. of liquid sweetener, 6 oz. of orange juice are added to the mixture together with about 20 drops of single strength orange oil taken from the peel.

7. An edible citrus product comprising the meat pulp of a citrus fruit separated from the peel, seed and segmental membranes, having a moisture content of about 70%–99%, the juice of the citrus fruit and a liquid sweetening agent together with a flavoring agent consisting of oil from the peel of the citrus fruit, the quantities being such that the mixture is viscous but pourable.

8. An edible frozen orange product comprising solely the meat pulp of an orange, separated from the peel, seed and the segmental membranes, having a moisture content of about 70%–99%, the juice of the orange, cane and corn syrup and orange oil in the proportion of 1½ pounds of meat pulp, 6 oz. of syrup, 6 oz. of orange juice to 20 drops of orange oil.

References Cited in the file of this patent

UNITED STATES PATENTS

| 1,045,849 | Jefferies | Dec. 3, 1912 |
| 2,650,881 | Forkner | Sept. 1, 1953 |

OTHER REFERENCES

"The Chemistry and Technology of Fruit and Vegetable Juice Production," by D. K. Tressler and M. A. Joslyn, published 1954 by The Avi Publishing Co., Inc., New York, N. Y., pp. 177, 606, 614, 607, 734, 735.